United States Patent
Miszewski

(10) Patent No.: US 8,878,688 B2
(45) Date of Patent: Nov. 4, 2014

(54) WELL DOWNHOLE CONDITION SIGNALLING

(75) Inventor: Antoni Miszewski, Exeter (GB)

(73) Assignee: Antech Limited, Exeter (GB)

( * ) Notice: Subject to any disclaimer, the term of this patent is extended or adjusted under 35 U.S.C. 154(b) by 1726 days.

(21) Appl. No.: 11/973,109

(22) Filed: Oct. 5, 2007

(65) Prior Publication Data

US 2008/0089175 A1     Apr. 17, 2008

(30) Foreign Application Priority Data

Oct. 12, 2006  (GB) .................................. 0620251.9

(51) Int. Cl.
| | | |
|---|---|---|
| *G01V 1/00* | (2006.01) | |
| *E21B 47/09* | (2012.01) | |
| *E21B 47/14* | (2006.01) | |
| *G01V 11/00* | (2006.01) | |

(52) U.S. Cl.
CPC .............. *E21B 47/09* (2013.01); *G01V 11/002* (2013.01); *E21B 47/14* (2013.01)
USPC ..................................... 340/855.6; 340/855.4

(58) Field of Classification Search
CPC ............. G01V 1/06; G01V 1/08; G01V 1/22; G01V 11/002; E21B 47/0005; E21B 47/12; E21B 47/14
USPC ........... 367/35, 81–85, 147; 340/853.1–856.3
See application file for complete search history.

(56) References Cited

U.S. PATENT DOCUMENTS

| | | | | |
|---|---|---|---|---|
| 4,039,042 A | * | 8/1977 | Edwards et al. | ............... 181/106 |
| 4,066,994 A | * | 1/1978 | Patchett et al. | .................. 367/81 |
| 4,293,936 A | * | 10/1981 | Cox et al. | ......................... 367/82 |
| 6,305,467 B1 | | 10/2001 | Connell et al. | |
| 6,396,415 B1 | * | 5/2002 | Bulmer | ........................ 340/855.8 |
| 6,604,582 B2 | | 8/2003 | Flowers et al. | |
| 6,896,056 B2 | * | 5/2005 | Mendez et al. | ............. 166/254.2 |
| 7,182,151 B2 | * | 2/2007 | Stump et al. | ..................... 175/45 |
| 7,624,681 B2 | * | 12/2009 | Goodman et al. | ............. 102/310 |
| 2003/0010495 A1 | | 1/2003 | Mendez et al. | |

FOREIGN PATENT DOCUMENTS

| | | |
|---|---|---|
| DE | 37 03 244 | 8/1988 |
| GB | 2231152 | 11/1990 |
| GB | 2348954 A | 10/2000 |
| SU | 1006734 | 7/1981 |

OTHER PUBLICATIONS

GB Search Report, Dec. 3, 2007.

* cited by examiner

*Primary Examiner* — Krystine Breier
(74) *Attorney, Agent, or Firm* — Fay Sharpe LLP

(57) ABSTRACT

A downhole tool 10 includes means for detecting a downhole condition, a capacitor bank, and a sparker. The technique is particularly useful for detecting casing collars. As the tool is passed along the well bore 11, it detects collars 12. On each detection, a part of the capacitor bank is discharged through the sparker. This generates an acoustic pulse which is transmitted through the ground (wave 14) to detectors 15, 16. The movement of the tool 10 is also monitored by a movement detector 20. The position of the tool 10 is correlated with the positions of the collars 12 by a computer 22 fed via interfacing circuitry 21. If desired, the pulses may be coded by strength, number, time spacing, etc.

15 Claims, 1 Drawing Sheet

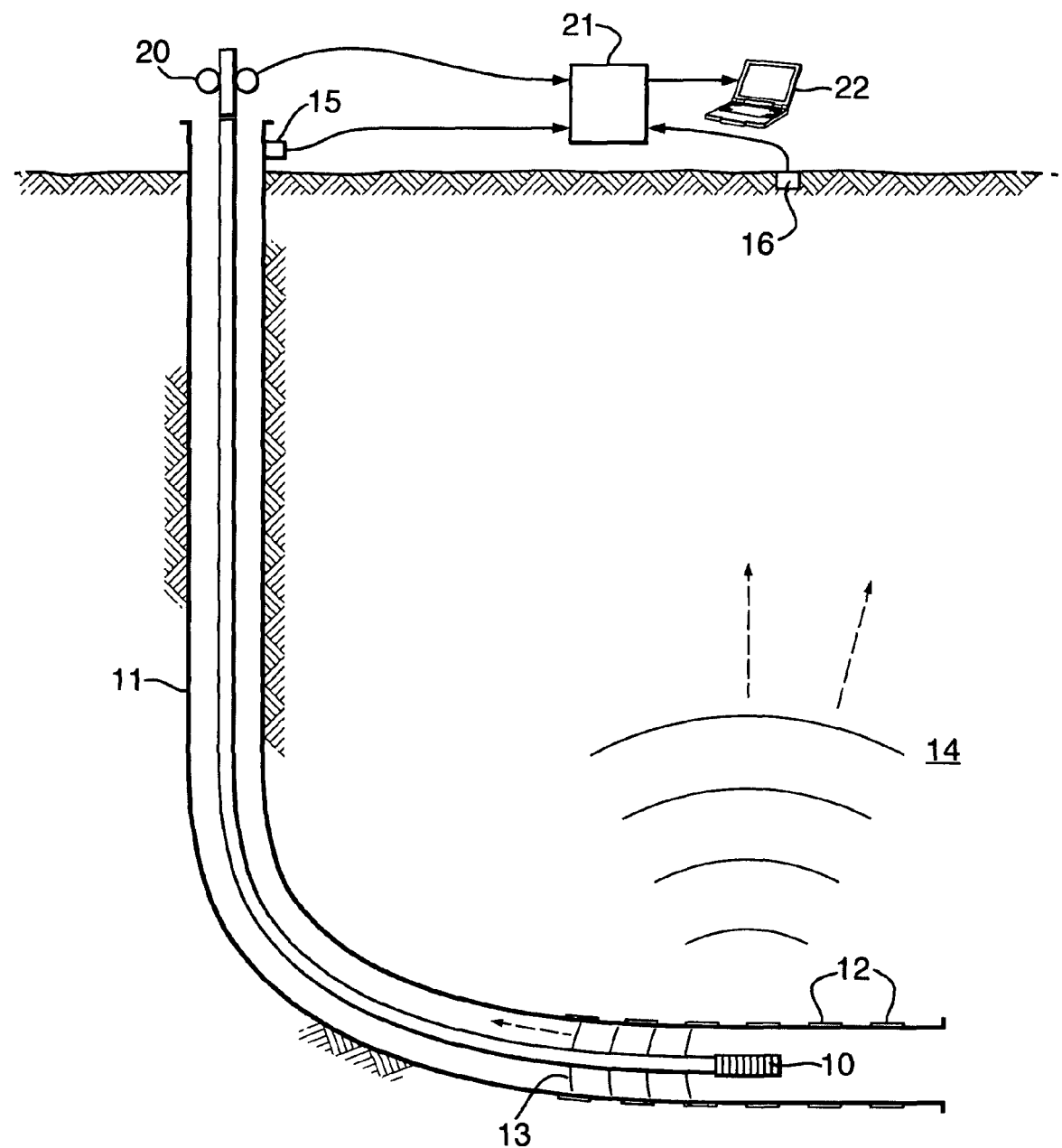

WELL DOWNHOLE CONDITION SIGNALLING

CROSS-REFERENCE TO RELATED APPLICATIONS

This application claims priority to and the benefit of UK Patent Application No. GB0620251.9, filed Oct. 12, 2006, the entirety of which is hereby incorporated by reference as if fully set forth herein.

BACKGROUND

The present invention relates to the signalling of downhole conditions in oil wells and the like.

Knowledge of the conditions in a well bore is of vital importance in well operations. Such conditions may include the depth of tools and equipment and the is end of a well string, pressure or temperature crossing a particular threshold, a valve in such equipment opening or closing, or the last gun in a string firing.

Some conditions can be determined from the surface, as for example the depth of tools and equipment. Direct methods that are used include measuring the length of pipe joints as they are run in hole, and a measuring wheel running against cable or continuous pipe.

These methods are largely "dead reckoning" techniques which involve only surface measurements. The disadvantage of these methods is that they do not involve any detection of downhole features, so they depend on pre-existing knowledge of the hole characteristics.

Since the layers of rock formation are fixed, it is also possible to correlate depth against a log of some physical property of the rock formation. In practice it is usual to compare an electric wireline log of natural gamma ray intensity with a log showing where the joints are in the steel casing that is used to line the well bore. This method means that subsequent runs can use a relatively simple casing collar log only, without having to log the actual formation properties again. A similar technique is to tag a feature of known depth in the well bore.

Some of these methods involve measuring downhole conditions. The disadvantage of these latter methods is that an electric wireline to surface is required to transmit the signal measured. This is not always convenient. Example of this are when running jointed pipe or when running continuous pipe (coiled tubing) without an integral electric line incorporated, or when running stranded/slickline operations.

It is known to use acoustic signal transmission techniques to overcome this problem. Thus Schlumberger/Flowers et al, U.S. Pat. No. 6,604,582, uses an acoustic transmitter comprising a flow based signalling system using a flow diverter to generate pressure pulses which can be detected at surface. Halliburton/Connell et al, U.S. Pat. No. 6,305,467 also uses a flow based system using a solenoid valve. Baker Hughes/Mendez et al, U.S. Pat. No. 6,896,056, uses acoustic signalling with transmission up the pipe or tubing to the surface. (All these systems contemplate CCL (casing collar location) as the, or one of the, conditions in the hole which are detected and so signalled to the surface.)

There is also a German patent document, DE 37 03 244, Bergwerksverband, which uses a system involving signalling through the water surrounding the drilling pipe. The transmitter is pointed down the column of water, and the receiver is mounted pointing up the column (or vice versa). The transmitter uses a spark gap mounted at the focus of a hollow paraboloid to focus the waves up the drilling pipe hole, and a receiver at the top. This is an improvement on an earlier system which did not use focussing of this kind.

All these systems have potential disadvantages. In the Schlumberger and Halliburton systems, a fluid flow path is required to surface, debris in the system can block the ports, and the fluid flow path has to circulate through the tool. In the Baker Hughes system, the tubular pipework needs to extend continuously to the surface, and profile and/or material changes in the tubular piping can affect signal strength. The same holds for the Bergwerksverband system and its predecessor.

SUMMARY

A summary of one or more aspects of the invention is now presented in order to facilitate a basic understanding thereof, wherein this summary is not an extensive overview of the invention, and is intended neither to identify certain elements of the invention, nor to delineate the scope of the invention. Rather, the primary purpose of the summary is to present some concepts of the invention in a simplified form prior to the more detailed description that is presented hereinafter.

According to the invention there is provided downhole condition signalling apparatus comprising detection means for detecting a downhole condition and sparker means responsive to the detection means to generate an acoustic signal which is transmitted through the surrounding earth. The apparatus preferably includes signal processing means coupling the detection means to the sparker means. The invention also provides a downhole condition detection system comprising the above apparatus and surface means remote from the well head for detecting signals from the sparker.

In the simplest form of the present system, the sparker is either operated or not, i.e. gives a pulse or not. That represents the detection of a single binary condition, i.e. a 0/1 output signal. However, further different values of a condition (e.g. temperature) can be indicated by coding the signal emitted by the sparker. The sparker can be designed to produce pulses of different strengths or a series of pulses, possibly with different strengths and/or different timings between the pulses. Similarly, different conditions can be detected and signalled by different pulse codings (eg strength, timing, etc). Further, the system can be arranged to provide a desired delay between detecting a condition and the operation of the sparker.

A significant feature of the present system is the ability to transmit the signals without the use of wire. The transmitter uses a high energy sparker to transmit acoustic signals. These signals may travel through the earth or, if there is a fluid column, through that column; however, the presence of such a fluid column to the surface is not essential.

The basic operation of this system is effectively equivalent to that explained in the introduction of the Baker patent, except that the present transmission signal is generated by the discharge of a sparker and is sent either directly through the formation or up the column of fluid rather than through the pipe.

A sparker is a pair of electrodes connected to a big capacitor bank which stores energy, e.g. 1500 J at high voltage. When the capacitor bank is discharged across the electrodes, the spark vaporises the fluid around it, and the creation and collapse of the resulting bubble sends a pressure wave up the fluid column, or through the ground, to a detector at surface. Sparkers are a known technology and have been used as seismic signal sources in the past.

A particular application of the present system is to the location of casing collars in a well. In this application, the invention provides a CCL (casing collar locator) system which can detect the presence of joints in oilfield tubulars and can then transmit the signals to the surface in real-time so that they can be plotted against depth of the tool.

A CCL (casing collar locator) comprises collar locating circuitry such as a conventional coil and 2 magnets, a Hall effect device, or a magnetoresistive device, which senses the presence of a signal disturbance. The signal generated by the collar locating device is passed to a discrimination and control circuit which identifies whether a collar has been detected.

BRIEF DESCRIPTION OF THE DRAWING

The following description and drawings set forth in detail certain illustrative implementations of the invention, which are indicative of several exemplary ways in which the principles of the invention may be carried out. Various objects, advantages and novel features of the invention will become apparent from the following detailed description of the invention when considered in conjunction with the drawings, in which:

FIG. 1 is a sectional side view illustrating a CCL locating system embodying the invention.

BRIEF DESCRIPTION OF A PREFERRED EMBODIMENT

One or more exemplary implementations of the present invention are hereinafter illustrated and described, wherein like reference numerals are used to refer to like elements throughout and wherein the illustrated structures are not necessarily drawn to scale.

An embodiment of the invention and its manner of operation will now be described by way of example and with reference to the drawing FIG. 1, which shows the present system in a well.

In the present system, joint detection is achieved as follows. A battery is used to power a high voltage (1500-3000 V) DC-DC converter, which charges a capacitor bank in the downhole tool 10 while it is still on the surface. The tool is then lowered into the well bore 11.

As the tool traverses along the well bore, the collar locating circuitry in the tool 10 monitors its surroundings, ie the well bore around it, for a casing collar. (Several such collars 12 are shown.) If it detects such a casing collar, it sends a signal to the capacitor bank to discharge the bank across the sparker electrodes. The spark vaporises the fluid around it, and the creation and collapse of the resulting bubble sends a pressure wave 13 up through the ground, as ground wave 14, to a well detector 15 and/or a ground detector 16 at the surface.

At the surface, the relative motion of the conveying means (drill pipe, coiled tubing etc.) is detected using some form of linear to rotary detector 20. The surface motion is plotted against the signal received from below ground by a computer 22 via interfacing circuitry 21. This log can be compared to a correlation log made on a previous occasion.

If desired, the sparker capacitor bank can be split into sections which can be fired (discharged) independently. This will enable the positions of several successive casing collars to be detected, and/or differently coded signals (eg by amplitude, or by pulse sequence) to be generated. If desired, a time delay can also be provided between the detection of a casing collar and the firing of the sparker.

Since a sparker has higher, more concentrated output energy than a pressure pulse created by a flow diversion or a solenoid, higher energy pulses can generally be transmitted satisfactorily, directly through the rock formation. A continuous liquid column to surface is not required. In horizontal wells in particular, the surface signal receiver can be located above the well bore away from the rig, and it is therefore does not have to have hazardous area certification in this configuration.

The invention claimed is:

1. A downhole condition detection system, particularly for use in an oil well extending from a wellhead at a ground surface, including a downhole condition signalling apparatus comprising:
   a first detection means for detecting a downhole condition of the oil well and producing a signal representing the downhole condition,
   a sparker means responsive to the first detection means for converting the signal produced by the first detection means to an acoustic signal, and
   a capacitor bank chargeable with energy for operating the sparker means;
   the system further including a second detection means disposed at or near the ground surface for detecting the acoustic signal transmitted from the sparker means to indicate the downhole condition;
   wherein a movement detector is arranged at the ground surface for monitoring the position of the apparatus; and
   wherein a computer is provided for correlating the position of the apparatus with the acoustic signal detected by the second detection means.

2. The system of claim 1, wherein the first detection means produces the signal representing the presence of a downhole casing collar.

3. A downhole condition detection system, particularly for use in an oil well extending from a wellhead at a ground surface, including a downhole condition signalling apparatus comprising:
   a first detection means for detecting a downhole condition of the oil well and producing a signal representing the downhole condition,
   a sparker means responsive to the first detection means for converting the signal produced by the first detection means to an acoustic signal, and
   a capacitor bank chargeable with energy for operating the sparker means;
   the system further including a second detection means disposed at or near the ground surface for detecting the acoustic signal transmitted from the sparker means to indicate the downhole condition;
   wherein the second detection means is disposed at a position remote from the wellhead for detecting the acoustic signal transmitted from the sparker means through the ground.

4. The system of claim 3, wherein a movement detector is arranged at the ground surface for monitoring the position of the apparatus, and a computer is provided for correlating the position of the apparatus with the acoustic signal detected by the second detection means.

5. The system of claim 1, wherein the acoustic signal comprises a series of pulses.

6. The system of claim 5, wherein the series of pulses is coded by time spacing.

7. The system of claim 1, wherein a battery is provided for supplying energy to the capacitor bank.

8. The system of claim 7, wherein the capacitor bank is charged by a high voltage DC-DC converter powered by the battery.

9. The system of claim 1, wherein a time delay is provided between the detection of the downhole condition and the operation of the sparker means.

10. The system of claim 3, wherein the first detection means produces the signal representing the presence of a downhole casing collar.

11. The system of claim 3, wherein a time delay is provided between the detection of the downhole condition and the operation of the sparker means.

12. The system of claim 3, wherein the acoustic signal comprises a series of pulses.

13. The system of claim 12, wherein the series of pulses is coded by time spacing.

14. The system of claim 4, wherein a battery is provided for supplying energy to the capacitor bank.

15. The system of claim 14, wherein the capacitor bank is charged by a high voltage DC-DC converter powered by the battery.

\* \* \* \* \*